United States Patent
Kunieda et al.

(12) 
(10) Patent No.: US 6,238,606 B1
(45) Date of Patent: May 29, 2001

(54) PROCESS FOR PREPARING PELLETS OF SAPONIFIED ETHYLENE/VINYL ACETATE COPOLYMER

(75) Inventors: Makoto Kunieda; Koji Izumi, both of Kurashiki; Kenji Ninomiya, Ibaraki, all of (JP)

(73) Assignee: Nippon Gohsei Kagaku Kogyo, Osaka (JP)

( * ) Notice: Subject to any disclaimer, the term of this patent is extended or adjusted under 35 U.S.C. 154(b) by 0 days.

(21) Appl. No.: 09/297,688

(22) PCT Filed: Sep. 7, 1998

(86) PCT No.: PCT/JP98/04007

§ 371 Date: May 6, 1999

§ 102(e) Date: May 6, 1999

(87) PCT Pub. No.: WO99/12714

PCT Pub. Date: Mar. 18, 1999

(30) Foreign Application Priority Data

| Sep. 8, 1997 | (JP) | 9-260844 |
| Sep. 8, 1997 | (JP) | 9-260845 |
| Sep. 17, 1997 | (JP) | 9-272058 |
| Feb. 4, 1998 | (JP) | 10-039764 |
| Apr. 10, 1998 | (JP) | 10-116110 |
| May 15, 1998 | (JP) | 10-152148 |
| Apr. 10, 1999 | (JP) | 10-116111 |

(51) Int. Cl.$^7$ ............................. B29C 47/00; B29C 69/02
(52) U.S. Cl. ..................... 264/143; 264/178 R; 264/203; 264/331.18
(58) Field of Search ............................. 525/58; 264/143, 264/148, 178 R, 203, 183, 331.18

(56) References Cited

U.S. PATENT DOCUMENTS

| 3,847,845 | * | 11/1974 | Tada et al. . |
| 3,932,574 | * | 1/1976 | Shiraishi et al. . |
| 4,041,223 | * | 8/1977 | Amemiya et al. . |
| 4,367,305 | * | 1/1983 | Satoh et al. . |
| 4,547,329 | * | 10/1985 | Dombroski et al. . |
| 4,576,988 | * | 3/1986 | Tanaka et al. . |
| 4,719,259 | * | 1/1988 | Jenkins . |
| 4,847,361 | * | 7/1989 | Asano et al. . |
| 5,118,743 | * | 6/1992 | Yonezu et al. . |
| 5,194,474 | * | 3/1993 | Aoyama et al. . |
| 5,342,662 | * | 8/1994 | Aoyama et al. . |

FOREIGN PATENT DOCUMENTS

| 56-41204 | 4/1981 | (JP) . |
| WO99/12714 | * 3/1999 | (WO) . |

\* cited by examiner

Primary Examiner—Jan H. Silbaugh
Assistant Examiner—Mark Eashoo
(74) Attorney, Agent, or Firm—Armstrong, Westerman, Hattori, McLeland & Naughton, LLP

(57) ABSTRACT

In the method of continuously producing pellets by continuously extruding a saponified ethylene-vinyl acetate (EVOH) solution in a strand form into a coagulation liquid and then cutting the resulting strand, the ratio between the weight X of the coagulation liquid and the weight Y of the strand of the saponified ethylene-vinyl acetate copolymer, namely the ratio X/Y, is set at 50 to 10,000. The coagulation liquid preferably contains 1 to 10,000 ppm of a carboxylic acid, 1 to 50,000 ppm of a carboxylic acid ester, or 1 to 15,000 ppm of a carboxylic acid salt. It is preferred as well that the water content of the continuously produced EVOH pellets be adjusted to 20 to 80% by weight and then brought into contact with an aqueous solution, having at least one boron compound, an acetic acid salt and a phosphoric acid compound.

6 Claims, No Drawings

PROCESS FOR PREPARING PELLETS OF SAPONIFIED ETHYLENE/VINYL ACETATE COPOLYMER

TECHNICAL FIELD

The present invention relates to a method of producing saponified ethylene-vinyl acetate copolymer (hereinafter abbreviated as EVOH) pellets. More particularly, it relates to a method of producing EVOH pellets by which EVOH pellets with a fair degree of precision in pellet size can be produced in a continuous manner and which gives EVOH pellets showing good melt moldability, in particular good melt moldability in forming multilayer laminates.

BACKGROUND ART

Generally, EVOH is excellent in transparency, gas barrier property, aroma-retaining property, solvent resistance, oil resistance and other characteristics. Owing to such characteristics, EVOH is molded into and utilized as films or sheets and bottles or other containers, among others, for use as food packaging materials, drug packaging materials, industrial chemical packaging materials or agrochemical packaging materials, for instance.

As a method of producing EVOH pellets, a process is known which comprises extruding an alcohol solution or a solution in an alcohol-water mixed solvent of EVOH as obtained by copolymerizing an ethylene and vinyl acetate and further saponifying the thus-obtained ethylene-vinyl acetate copolymer into a coagulation liquid in the form of a strand and cutting the resulting strand to give EVOH pellets.

The EVOH pellets obtained in the above manner are generally subjected to drying treatment to give product pellets. As regards the method of drying on that occasion, Japanese Patent Publication S46-37665 suggests that EVOH be subjected to fluidized-state drying with stirring in an inert gas atmosphere with an oxygen content of not more than 5% at 95° C. or below.

The thus-obtained product pellets are molded into various kinds of product. In their molding, melt molding is generally conducted, whereby they are processed into such forms or shapes as films, sheets, bottles, cups, tubes, pipes and so forth. The processability (moldability) on that occasion is very important and, in many instances, generally for the purpose of providing mechanical strength, moisture resistance, heat sealability and other properties, they are coextruded with a substrate such as a polyolefin resin via an adhesive layer to give laminates.

For improving the moldability mentioned above, the method comprising incorporating a boron compound in EVOH (Japanese Kokai Tokkyo Koho S59-192564 and S55-12108, Japanese Patent Publication S49-20615, etc.) and the method comprising causing EVOH to contain a metal salt such as sodium acetate (Japanese Kokai Tokkyo Koho S51-91988, S56-41204 and S64-66262, etc.) have been proposed. Furthermore, it has been attempted to incorporate a phosphoric acid compound in EVOH (Japanese Kokai Tokkyo Koho S52-954 and H02-235952, etc.), and the present applicant has also proposed to treat EVOH with a phosphoric acid compound to improve the thermal stability and/or melt moldability (e.g. prevention of fish eyes or gels) (Japanese Kokai Tokkyo Koho S62-143954).

However, in the above-mentioned methods of producing EVOH pellets, the weight ratio between the coagulating liquid and the EVOH strand (coagulant/strand ratio) is set at a low level not higher than 50 so that the amount of solvent may be reduced and the loss of EVOH due to dissolution may be prevented. It has been revealed, however, that there are drawbacks in that case; for example, the strand may break or a poor pellet size precision may result. Therefore, when those EVOH pellets obtained by the conventional methods are used in extrusion molding, the charge into the extruder and the load on the extruder, for instance, tend to fluctuate and, as a result, it becomes not always easy to perform the molding procedure in a stable manner. Therefore, EVOH pellets uniform in shape and size are desired.

Further, as regards the method of drying EVOH, it has been revealed that the fluidized-state drying described in Japanese Patent Publication S46-37665 as such, though effective in reducing fish eyes of EVOH, allows great fluctuations in torque and discharge rate in the step of melt molding and further may cause defects in uniformity of thickness of moldings. Consumers are now strongly demanding marketing of EVOH pellets excellent in such melt moldability.

In addition, to cope with recent increasing requirements with regard to performance characteristics of moldings, the technologies of the above-cited Japanese Kokai Tokkyo Koho S59-192564 and S55-12108, Japanese Patent Publication S49-20615, and Japanese Kokai Tokkyo Koho S51-91988, S56-41204, S64-66262, S52-954 and H02-235952 were carefully evaluated and, as a result, it was revealed that these technologies, when applied to melt molding of EVOH pellets, indeed produce improvements with respect to fish eyes or gels with a diameter not less than 0.1 mm but cannot always solve the problem of small fish eyes or gels with a diameter less than 0.1 mm and that, in particular, said technologies fail to give thorough consideration to the melt moldability in the production of multilayer laminates and possibly allow occurrence of fish eyes and the like smaller than 0.1 mm in size on multilayer laminates depending on the conditions of molding thereof. It was thus found that further improvements are desirable to solve these problems, among others.

It is an object of the present invention to provide a method of producing EVOH pellets by which the occurrence of fish eyes and the like smaller in size than 0.1 mm can be prevented in particular in producing multilayer laminates and by which good long-run moldability can be attained.

DISCLOSURE OF INVENTION

The method of producing saponified ethylene-vinyl acetate copolymer (EVOH) pellets according to the present invention is characterized in that, in the process of continuous pellet production by continuously extruding an EVOH solution into a coagulation liquid in the form of a strand and then cutting said strand, the ratio between the weight X of the coagulating liquid and the weight Y of the EVOH strand, namely X/Y, is set at 50 to 10,000.

In the above case, it is desirable that the coagulation liquid contain 1 to 10,000 ppm of a carboxylic acid, 1 to 50,000 ppm of a carboxylic acid ester, or 1 to 15,000 ppm of a carboxylic acid salt.

And, it is desirable that the EVOH pellets thus produced continuously adjusted to a water content of 20 to 80% by weight and then brought into contact with an aqueous solution containing, at a specific concentration, at least one compound selected from the group consisting of a boron compound (B), an acetic acid salt (C) and a phosphoric acid compound (D).

Further, it is desirable that the thus-obtained EVOH pellets be further subjected to drying treatment comprising a combination of stationary-state drying and fluidized-state drying.

In the following, the present invention is described in detail.

The ethylene-vinyl acetate copolymer, which serves as a starting material for the saponified ethylene-vinyl acetate copolymer (EVOH) to be used in the practice of the present invention, preferably has an ethylene content of 15 to 60 mole percent, more preferably 20 to 55 mole percent. An ethylene content less than 15 mole percent is unfavorable from the practical viewpoint in that, in the step of precipitating the derivative EVOH in a strand form in the coagulation liquid, the precipitation is incomplete and the strand is partly dissolved and that, for maintaining the EVOH solution in a uniform solution state, pressurization and/or heating at a high temperature is required, which is unfavorable from the operation viewpoint, and further that the derivative EVOH shows a decreased gas barrier property under high humidity conditions and/or a reduced level of melt moldability. When, on the other hand, the ethylene content exceeds 60 mole percent, it becomes difficult to prepare a uniform solution from the EVOH prepared by saponification, thus the desired strand cannot be obtained and, furthermore, a sufficient level of gas barrier property cannot be obtained; such is unfavorable from the practical viewpoint.

The above-mentioned ethylene-vinyl acetate copolymer may contain, in addition to ethylene and vinyl acetate, one or more ethylenically unsaturated monomers copolymerizable therewith as comonomer components. As said monomers, there may be mentioned olefins such as propylene, isobutylene, α-octene, α-dodecene and α-octadecene; unsaturated acids such as acrylic acid, methacrylic acid, crotonic acid, maleic acid, maleic anhydride and itaconic acid, or salts or mono or dialkyl esters thereof; nitriles such as acrylonitrile and methacrylonitrile; amides such as acrylamide and methacrylamide; olefinsulfonic acids such as ethylenesulfonic acid, allylsulfonic acid and methallylsulfonic acid, or salts thereof; alkyl vinyl ethers; N-acrylamidomethyltrimethylammonium chloride, allyltrimethylammonium chloride; dimethylallyl vinyl ketone; N-vinylpyrrolidone; vinyl chloride, vinylidene chloride; polyoxyalkylene(meth)allyl ethers such as polyoxyethylene (meth) allyl ether and polyoxypropylene (meth)allyl ether; polyoxyalkylene (meth)acrylates such as polyoxyethylene (meth)acrylate and polyoxypropylene (meth)acrylate; polyoxyalkylene(meth) acrylamide such as polyoxyethylene (meth) acrylamide and polyoxypropylene(meth)acrylamide; polyoxyethylene(1-(meth)acrylamido-1,1-dimethylpropyl) ester; polyoxyethylene vinyl ether, polyoxypropylene vinyl ether; polyoxyethyleneallylamine, polyoxypropyleneallylamine, polyoxyethylenevinylamine, polyoxypropylenevinylamine; etc.

The EVOH to be used in the present invention is obtained by saponifying such an ethylene-vinyl acetate copolymer as mentioned above. On that occasion, the saponification reaction is carried out in the presence of an alkali catalyst and, as the alkali catalyst, any of those known catalysts which are used in the alkali-catalyzed saponification reaction of polyvinyl acetate or ethylene-vinyl acetate copolymers may be used. Specifically, mention may be made of alkali metal hydroxides such as sodium hydroxide, potassium hydroxide and lithium hydroxide, alkali metal alcoholates such as sodium methylate and potassium t-butoxide, strongly basic amines, typically 1,8-diazabicyclo[5.4.0]undecene-7 (DBU), and further alkali metal carbonates and alkali metal hydrogen carbonates. The use of sodium hydroxide, among others, is preferred for reasons of ease of handing and cost, for instance.

The alkali catalyst is used suitably in an amount of not more than 0.05 equivalent, preferably not more than 0.03 equivalent, relative to the vinyl acetate groups in the ethylene-vinyl acetate copolymer, although said amount may depend on the degree of saponification, the reaction temperature, etc. It is also possible to use an acid catalyst, such as hydrochloric acid or sulfuric acid, in lieu of the alkali catalyst.

In carrying out the saponification, the above-mentioned ethylene-vinyl acetate copolymer is dissolved in an alcohol or an alcohol-containing medium generally to a concentration of about 20 to 60% by weight, an alkali catalyst, or an acid catalyst as the case may be, is added, and the reaction is carried out at a temperature of 40 to 140° C.

When due consideration is given to prevent precipitation of EVOH at such solution temperature, the concentration of EVOH may be generally 10 to 55% by weight, preferably 15 to 50% by weight, although there are no particular restrictions on said concentration.

The degree of saponification of the vinyl acetate component of the EVOH obtained by the above saponification is preferably 70 to 100 mole percent, more preferably 80 to 100 mole percent. When the saponification degree is below 70 mole percent, the gas barrier property, heat stability, moisture resistance and other properties of the EVOH will unfavorably be inferior.

In the present invention, an EVOH species having a certain composition may be used singly or two or more EVOH species differing in composition may be used combinedly, if the ethylene content and saponification degree of each are within the respective ranges specified above.

The alcoholic EVOH solution obtained in the above is used as it is for strand production, or a solution for strand production is prepared preferably by adding water to the EVOH solution, or by properly concentrating or diluting the EVOH solution and then adding water.

At this timepoint, lubricants such as saturated aliphatic amides (e.g. stearamide), unsaturated fatty acid amides (e.g. olefinic acid amides), bis-fatty acid amides (e.g. ethylenebisstearamide) fatty acid metal salts (e.g. calcium stearate), low-molecular-weight polyolefins (e.g. low-molecular-weight polyethylene or low-molecular-weight polypropylene, with a molecular weight of about 500 to 10,000), etc., inorganic salts (e.g. hydrotalcite), plasticizers (e.g. aliphatic polyhydric alcohols such as ethylene glycol, glycerol and hexanediol), ultraviolet absorbers, antioxidants, colorants, antimicrobial agents, fillers, other resins and other additives may be incorporated.

Then, the above EVOH solution is extruded into a coagulation liquid in a strand form to cause precipitation. The concentration of EVOH in said solution is preferably set at 10 to 55% by weight, more preferably 25 to 50% by weight. When the EVOH concentration is below 10% by weight, coagulation is difficult to occur in the coagulation liquid. When, conversely, said concentration exceeds 55% by weight, the EVOH pellets obtained will have a low void ratio (porosity), which may adversely affect the heat stability in melt molding.

It is desirable that the EVOH solution be a solution in a mixed solvent composed of an alcohol and water, as mentioned above. The alcohol/water mixing ratio in that case is preferably adjusted to 90/10 to 30/70 by weight, more preferably 80/20 to 40/60 by weight. When the alcohol/water ratio exceeds 90/10, the solution becomes rather unstable and the porosity in the step of strand precipitation decreases. When it is below 30/70, the solution becomes unstable and precipitation of EVOH may be caused.

The most characteristic feature of the present invention consists in that, in the step of continuously extruding the above-mentioned EVOH solution into a coagulation liquid in a strand form, the ratio between the weight X of the coagulation liquid and the weight Y of the EVOH strand, namely the ratio X/Y, is adjusted. The weight ratio on that occasion is required to be 50 to 10,000. When this weight ratio X/Y is lower than 50, problems such as strand breakage may arise. When X/Y is higher than 10,000, the loss of EVOH as resulting from dissolution in the coagulation liquid unduly increases. It is preferred that the lower limit to this weight ratio X/Y be set at not less than 100, more preferably not less than 200, most preferably not less than 300, in particular not less than 500. As regards the upper limit to said weight ratio, it is preferred that it be set at not higher than 8,000, more preferably not higher than 7,000, most preferably not higher than 6,000.

As for the coagulation liquid, use may be made of water, water/alcohol mixed solvents, aromatic hydrocarbons such as benzene, ketones such as acetone and methyl ethyl ketone, ethers such as diisopropyl ether, organic acid esters such as methyl acetate, ethyl acetate and methyl propionate, and the like. Among them, water or a water/alcohol solvent is preferred.

When an alcohol is used, it is preferred that the alcohol concentration in the coagulation liquid be equal to or lower than the alcohol content of the above-mentioned alcohol/water mixture in the EVOH solution. When the alcohol concentration in the coagulation liquid is higher to an unpermissible extent than the alcohol content in the EVOH solution, the loss of EVOH in the coagulation liquid on the occasion of strand precipitation unfavorably increases.

Useful as said alcohol are such alcohols as methanol, ethanol and propanol. Methanol is particularly suitable, however.

In the practice of the present invention, it is particularly preferred that the above-mentioned coagulation liquid contain a specific amount of at least one compound selected from among carboxylic acids, carboxylic acid esters and carboxylic acid salts. The following description refers to this aspect.

When a carboxylic acid is incorporated in the coagulation liquid, the content of said carboxylic acid is 1 to 10,000 ppm, preferably 50 to 5,000 ppm. When the carboxylic acid content is below 1 ppm, a long period of time will be required for strand solidification, hence strand breakage tends to occur. When the carboxylic acid content is higher than 10,000 ppm, strand breakage also tend to occur.

Said carboxylic acid is not limited to any particular species. Thus, it includes formic acid, acetic acid, propionic acid, oxalic acid, malonic acid, succinic acid, glutaric acid, adipic acid, crotonic acid, maleic acid, itaconic acid and the like. Among them, acetic acid is especially preferred.

When a carboxylic acid ester is incorporated in the coagulation liquid, the content of said carboxylic acid ester is 1 to 50,000 ppm, preferably 10 to 10,000 ppm. When the carboxylic acid ester content is lower than 1 ppm or higher than 50,000 ppm, troubles tend to arise, for example a prolonged period of time may be required for strand solidification, or strand breakage may occur.

Said carboxylic acid ester includes, but is not limited to, methyl formate, ethyl formate, propyl formate, methyl acetate, ethyl acetate, propyl acetate, methyl propionate, ethyl propionate, methyl acetoacetate, ethyl acetate and the like. Among them, methyl acetate is most preferred.

When a carboxylic acid salt is incorporated in the coagulation liquid, the content of said carboxylic acid salt is 1 to 15,000 ppm, preferably 10 to 5,000 ppm. When the carboxylic acid salt content is lower than 1 ppm or higher than 15,000 ppm, troubles tend to arise, for example a prolonged period of time may be required for strand solidification, or strand breakage may occur.

Said carboxylic acid salt includes, but is not limited to, sodium formate, potassium formate, magnesium formate, calcium formate, sodium acetate, potassium acetate, magnesium acetate and the like. Sodium acetate is most preferred, however.

The time of contact between the coagulation liquid and the EVOH strand is preferably 10 seconds to 60 minutes, more preferably 15 seconds to 5 minutes. When the contact time is shorter than 10 seconds, strand solidification in the coagulation liquid tends to be insufficient. When said time exceeds 60 minutes, the loss of EVOH due to dissolution in the coagulation liquid tends to increase.

The temperature at which the EVOH solution is contacted with the coagulation liquid is suitably 10° C. to 40° C., preferably 0° C. to 20° C. It is safe to operate at a temperature as low as possible.

The EVOH solution is extruded into the coagulation liquid in a strand form through a nozzle with an opening having an arbitrary form, generally a circular form.

The shape of the nozzle mentioned above is not particularly restricted but preferably is cylindrical, and the nozzle length is 1 to 100 cm, preferably 3 to 30 cm, and the nozzle inside diameter is 0.1 to 10 cm, preferably 0.2 to 5 cm. In particular, it is preferred that the nozzle is cylindrical and the ratio between the nozzle length and inside diameter (length/inside diameter ratio) be 9 to 40. The nozzle thickness is 0.01 to 0.5 cm, preferably 0.1 to 0.3 cm.

While the sectional shape of the nozzle is preferably circular, as mentioned above, said shape may be oval, square or rectangular, rhombic or star-like, for instance, in some instances.

The EVOH is thus extruded in a strand form through the nozzle. It is not always necessary that the strand be single but an arbitrary number of strands, say several to hundreds of strands, may be extruded at a time.

The EVOH extruded in a strand form, after sufficient advancement of solidification, is cut to give pellets. As for the shape of the EVOH pellets obtained, there is no particular restriction. From the viewpoint of workability and handling in molding, cylinders with a diameter of 1 to 10 mm and a length of 1 to 10 mm, or spheres with a diameter of about 1 to 10 mm are practical.

The EVOH pellets obtained are then washed generally with water.

Regarding the washing conditions, a method generally employed comprises washing the EVOH pellets in a water bath containing water and/or an acid at a temperature of 10° C. to 60° C. By this washing, oligomers and impurities in the EVOH are eliminated.

By carrying out the present invention in the above manner, EVOH pellets excellent in size precision can be continuously obtained.

While, in the present invention, it is preferred that the EVOH pellets obtained in the above manner are directly subjected to drying treatment in two steps as mentioned later herein, it was found that EVOH pellets improved in melt moldability, in particular mechanical strength, heat stability and interlaminar adhesion in multilayer laminates and excellent in long-run moldability can be obtained when, prior to said drying treatment, the EVOH pellets are treated with an aqueous solution containing, at a specific concentration, at least one compound selected from the group consisting of a boron compound (B), an acetic acid salt (C) and a phosphoric acid compound (D) In the following, the treatment with an aqueous solution of such compound is described in detail.

In carrying out said treatment, it is necessary that the water content of EVOH be adjusted to 20 to 80% by weight (preferably 30 to 70% by weight, more preferably 35 to 65% by weight). When the water content of EVOH pellets is lower than 20% by weight, the EVOH pellets obtained, upon melt molding, allow the formation of a large number of minute fish eyes. Conversely, when the water content is above 80% by weight, the EVOH pellets may fuse together in the later step of drying.

It is preferred that the EVOH pellets occur as a porous precipitate. Said porous precipitate has a microporous internal structure with pores having a diameter of 0.1 to 10 μm being uniformly distributed therein. Such precipitate can be obtained by adjusting, in the step of extruding the EVOH solution (e.g. in an alcohol/water mixed solvent) into the coagulation liquid, the concentration of the EVOH solution (10 to 55% by weight), the temperature (30° C. to 80° C.), the solvent (alcohol/water mixing ratio by weight =90/10 to 30/70), the coagulation bath temperature (−10° C. to 40° C.) and the residence time (10 seconds to 60 minutes) among others.

As said boron compound (B), there may be mentioned boric acid and metal salts thereof, for example calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. cupric borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganous borate, manganese metaborate, manganese tetraborate), lithium borate (e.g. lithium metaborate, lithium tetraborate, lithium pentaborate), and the like as well as borate minerals such as borax, kernite, inyoite, kotoite, suanite and szaibelyite. Among them, borax, boric acid and sodium borate (e.g. sodium metaborate, sodium diborate, sodium tetraborate, sodium pentaborate, sodium hexaborate, sodium octaborate) are suitably used.

As the acetic acid salt (C), there may be mentioned sodium acetate, potassium acetate, calcium acetate, magnesium acetate, zinc acetate, barium acetate, manganese acetate and the like. Among them, sodium acetate, potassium acetate, calcium acetate and magnesium acetate are suitably used.

As the phosphoric acid compound (D), there may be mentioned sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, manganese hydrogen phosphate and the like. Among them, sodium dihydrogen phosphate, potassium dihydrogen phosphate, calcium dihydrogen phosphate and magnesium dihydrogen phosphate are suitably used.

The EVOH pellets, after water content adjustment to 20 to 80% by weight, as mentioned above, are brought into contact with an aqueous solution of the compound mentioned above. On that occasion, the concentration of each compound in the aqueous solution is desirably adjusted as follows.

In the case of an aqueous solution of boron compound (B), the content of the boron compound (B) in the aqueous boron compound (B) solution should be 0.001 to 0.5 part by weight (preferably 0.001 to 0.3 part by weight, more preferably 0.002 to 0.2 part by weight) relative to 100 parts by weight of the sum total of the water contained in EVOH pellets and the water contained in the aqueous boron compound (B) solution. When said concentration is below 0.001 part by weight, it is difficult to cause the boron compound (B) to be contained in EVOH pellets at a desirable level. When, conversely, it exceeds 0.5 part by weight, moldings from the resin composition may have a large number of minute fish eyes, hence the object of the present invention will not be accomplished. In this case, the solution may contain methanol, ethanol, propanol, methyl acetate, ethyl acetate or the like in an amount of about 0.001 to 0.1% by weight.

In the case of an aqueous solution of acetic acid salt (C), the content of the acetic acid salt (C) in said aqueous acetic acid salt (C) solution should be 0.001 to 0.5 part by weight (preferably 0.005 to 0.4 part by weight, more preferably 0.01 to 0.3 part by weight) per 100 parts by weight of the sum total of the water contained in EVOH pellets and the water contained in the aqueous acetic acid salt (C) solution. When said concentration is below 0.001 part by weight, it is difficult to cause the acetic acid salt (C) to be contained in EVOH pellets at a desirable level. When, conversely, it exceeds 0.5 part by weight, moldings from the resin composition may have a large number of minute fish eyes, hence the object of the present invention will not be accomplished. In this case, the solution may contain methanol, ethanol, propanol, methyl acetate, ethyl acetate or the like in an amount of about 0.001 to 0.1% by weight.

In the case of an aqueous solution of phosphoric acid compound (D), the content of the phosphoric acid compound (D) in said aqueous phosphoric acid compound (D) solution should be 0.0001 to 0.5 part by weight (preferably 0.0005 to 0.3 part by weight, more preferably 0.001 to 0.1 part by weight) per 100 parts by weight of the sum total of the water contained in EVOH pellets and the water contained in the aqueous phosphoric acid compound (D) solution. When said concentration is below 0.0001 part by weight, it is difficult to cause the phosphoric acid compound (D) to be contained in EVOH pellets at a desirable level. When, conversely, it exceeds 0.5 part by weight, moldings from the resin composition may have a large number of minute fish eyes, hence the object of the present invention will not be accomplished. In this case, the solution may contain methanol, ethanol, propanol, methyl acetate, ethyl acetate or the like in an amount of about 0.001 to 0.1% by weight.

And, by the above treatment, EVOH pellets are caused to contain a boron compound (B), when such is used, in an amount of 0.001 to 1 part by weight (preferably 0.001 to 0.5 part by weight, more preferably 0.002 to 0.2 part by weight) calculated as boron, an acetic acid salt (C), when such is used, in an amount of 0.001 to 0.05 part by weight (preferably 0.0015 to 0.04 part by weight, more preferably 0.002 to 0.03 part by weight) calculated as the metal, and/or a phosphoric acid compound, when such is used, in an amount of 0.0005 to 0.1 part by weight (preferably 0.001 to 0.05 part by weight, more preferably 0.002 to 0.03 part by weight) calculated as phosphate radical, per 100 parts by weight of EVOH in the EVOH pellets. When the contents of these compounds are smaller than the respective ranges mentioned above, the EVOH pellets tend to show reduced moldability and, when the contents of these compounds are larger than the respective ranges mentioned above, moldings from the EVOH pellets tend to be inferior in appearance.

The content of the above-mentioned boron compound (B), acetic acid salt (C) or phosphoric acid compound (D) may be adjusted by controlling the concentration of the aqueous solution of boron compound (B), acetic acid salt (C) or phosphoric acid compound (D), the water content of EVOH pellets, the contact time, temperature, and/or rate of stirring, for instance, in the contacting treatment mentioned above. No particular restriction is posed on the method of such adjustment.

The EVOH pellets thus treated with the above-mentioned aqueous solutions of (B) to (D) are then submitted to the step of drying to give product pellets.

In the present invention, it is also possible, as mentioned above, to subject the EVOH pellets to drying treatment without treatment with such aqueous solutions of compounds It is desirable that the EVOH pellets to be subjected to drying treatment be adjusted to a water content of 20 to 80% by weight (more preferably 30 to 70% by weight). This is because when the water content is below 20% by weight, the melt moldability tends to become poor and, when it is above 80% by weight, the pellets may fuse together in the step of drying.

In the present invention, various drying methods may be employed as the method for such drying. It is particularly preferred, however, to carry out the drying in two stages by combining fluidized drying and stationary drying, namely the method comprising carrying out fluidized drying treatment followed by stationary drying treatment or the method comprising carrying out stationary drying treatment followed by fluidized drying treatment. Therefore, such drying process is described in the following.

The term "fluidized drying" as used herein means that EVOH pellets are dried while they are substantially stirred and dispersed mechanically or by means of hot air. As examples of the drier for carrying out fluidized drying, there may be mentioned cylindrical channel stirring dryers, cylindrical dryers, rotary dryers, fluidized bed dryers, vibrating fluidized bed dryers and conical rotary dryers.

The term "stationary drying" as used herein means that EVOH pellets are dried substantially free of stirring, dispersion or any other dynamic action. As examples of the drier for carrying out stationary drying, there may be mentioned material-standing type ones such as tray dryers for batchwise operation, and material-transferring type ones such as band dryers, tunnel dryers, vertical dryers and silo dryers.

As mentioned above, fluidized drying may be followed by stationary drying, or vice versa. Thus, after carrying out fluidized drying as primary drying, stationary drying is carried out as secondary drying or, after carrying out stationary drying as primary drying, fluidized drying is carried out as secondary drying. The former method is generally preferred, however.

In the following, the former method (method comprising carrying out fluidized drying as primary drying and then carrying out stationary drying as secondary drying) is described. However, the description has no limitative meaning, and the latter method can also be carried out with reference to the former.

Air or an inert gas (e.g. nitrogen gas, helium gas, gargon gas) is used as the heating gas in fluidized drying in the primary drying stage. The heating gas suitably has a temperature of not higher than 95° C., preferably 90° to 40° C., more preferably 90° C. to 55° C. If the heating gas temperature exceeds 95° C., the EVOH pellets may fuse together.

Under the above conditions, the velocity of the heating gas passing through the drier is suitably 0.7 to 10 m/sec, preferably 0.7 to 5 mlsec, more preferably 1 to 3 m/sec. At a passing velocity less than 0.7 m/sec, the EVOH pellets tend to fuse together. If the velocity exceeds 10 m/sec, the EVOH pellets tend to be chipped.

In particular when at least one of the boron compound (B), acetic acid salt (C) and phosphoric acid (D) is added to EVOH pellets, it is preferred that the velocity of the heating gas passing over the pellet surface be 1 to 10 m/sec and the velocity of the heating gas passing over the pellet surface in the secondary drying to be mentioned later herein be lower than 1 m/sec and/or that the average rate of drying, which is defined below in terms of formula (1), be 5 to 500 parts by weight/hour and that rate in the secondary drying be 0.1 to 5 parts by weight/hour.

Average rate of drying =(water content before drying −water content after drying) /drying time (hr)  (1)

wherein the water content refers to the water content (parts by weight) relative to 100 parts by weight of EVOH.

More specifically, it is preferred that the velocity of the heating gas passing over the EVOH pellet surface in the primary drying be adjusted to 1 to 10 m/sec, as mentioned above, preferably 1 to 5 m/sec, more preferably 1 to 3 m/sec. For adjusting this velocity, the rate of flow of the gas may be adjusted so that the above conditions may be satisfied within the heating gas velocity range mentioned above, and/or the rate of travel of EVOH pellets may be adjusted.

In the above operation, it is also preferred that the average drying rate in the primary drying be 5 to 500 parts by weight/hour, more preferably 10 to 300 parts by weight/hour. When said rate is less than 5 parts by weight/hour, fusion of EVOH pellets may occur during drying. When, conversely, it exceeds 500 parts by weight/hour, the EVOH pellets obtained may give a large number of minute fish eyes upon melt molding.

The time of fluidized drying treatment cannot be specified since it depends on the amount of EVOH pellets to be treated. Generally, however, a period of 5 minutes to 36 hours, in particular 10 minutes to 24 hours, is employed in many instances.

The above fluidized drying is carried out to an extent such that the water content of EVOH pellets is reduced to 5 to 60% by weight (preferably 10 to 55% by weight), which is lower by at least 5% by weight (preferably 10 to 45% by weight) as compared with the water content before fluidized drying. If such water content is below 5% by weight, the discharge tends to fluctuate when the product after stationary drying, which is mentioned below, is subjected to melt molding. If, conversely, the water content is higher than 60% by weight, the pellets tend to fuse together in the stage of stationary drying and, when the product pellets after stationary drying is melt-molded, fish eyes may be formed and, in particular the product pellets containing a boron compound (B), acetic acid salt (C) or phosphoric acid compound (D) unfavorably tends to give a number of minute fish eyes. If the reduction in water content is smaller than 5% by weight as compared with the water content before fluidized drying, the above-mentioned minute fish eyes unfavorably tend to be formed in large numbers.

After the above-mentioned fluidized drying, stationary drying is performed as a secondary drying. The heating gas to be used in stationary drying is an inert gas (e.g. nitrogen gas, helium gas, argon gas) The heating gas temperature is preferably not lower than 75° C., more preferably 85° C. to 150° C. If said temperature is below 75° C., the drying time becomes extremely long, which is economically disadvantageous.

In this stage, the velocity of the gas passing the drier is preferably not more than 1 m/sec, more preferably 0.01 to 0.5 m/sec. When the passing velocity exceeds 1 m/sec, it becomes difficult to maintain the EVOH pellets in a stationary state.

The time of stationary drying treatment cannot be specified since it depends on the amount of EVOH pellets to be treated. Generally, however, it is 10 minutes to 72 hours, preferably 1 to 48 hours.

The average rate of drying in this secondary drying is preferably 0.1 to 5 parts by weight/hour, more preferably 0.3 to 3 parts by weight/hour. If this rate is less than 0.1 part by weight/hour, fusion of pellets may occur and a long drying time will be required. If, conversely, said rate exceeds 5 parts by weight/hour, minute fish eyes may possibly be formed when the EVOH pellets obtained are subjected to melt molding.

It is preferred that the water content of EVOH pellets be reduced to 2% by weight or below, more preferably to 0.001 to 2% by weight (most preferably 0.01 to 1% by weight), by the above-mentioned secondary drying (stationary drying).

When this water content is below 0.001% by weight, the long-run moldability tends to decrease and, when it is above 2% by weight, bubbles tend to occur in the moldings.

EVOH pellets excellent in heat stability and long-run moldability, among others, can be obtained by the method of the present invention as mentioned above. In such pellets, use may be made, as necessary, of additives such as plasticizers, heat stabilizers, ultraviolet absorbers, antioxidants, colorants, antimicrobial agents, fillers, and other resins. In particular, hydrotalcite compounds, hindered phenols, hindered amine heat stabilizers, and higher aliphatic carboxylic acid salts may be added as gel formation inhibitors.

As suggested previously, the EVOH may comprise two or more different EVOH species. In this case, when a blend of EVOH species differing in ethylene content by not less than 5 mole percent and/or in saponification degree by not less than 1 mole percent is used, the secondary processability, such as stretchability at high-level stretching, vacuum pressure formability or deep draw formability, can be further improved while maintaining the gas barrier property.

The thus-obtained EVOH pellets are widely used in the field of moldings. They are shaped into remolded pellets, films, sheets, containers, fibers, rods, tubes and other various moldings by melt molding. Ground materials derived from these moldings (e.g. when collected waste articles are used for recycling) or remolded pellets may also be again subjected to melt molding.

As the method of melt molding, the techniques of extrusion molding (e.g. T-die extrusion, inflation extrusion, blow molding, melt spinning, contour extrusion) or injection molding are employed in most instances. The melt molding temperature is selected mostly within the range of 150° C. to 300° C.

The EVOH pellets obtained are also used widely in the field of laminates. In particular, they are used as laminates having a structure comprising an EVOH layer overlaid, on at least one side thereof, with a thermoplastic resin layer.

In producing this laminate, one side or both sides of an EVOH layer are overlaid with another substrate or other substrates. As the method of laminating, there may be mentioned, for example, the method comprising melt extruding a thermoplastic resin on an EVOH film or sheet, the method comprising contrariwise melt extruding EVOH on a substrate made of a thermoplastic resin or the like, the method comprising coextruding EVOH with another or other thermoplastic resins and, further, the method comprising sticking an EVOH film or sheet obtained by the present invention and a film or sheet made of another substrate material together by dry lamination using a known adhesive such as an organotitanium compound, isocyanate compound, polyester compound or polyurethane compound.

As the counterpart resin in the case of coextrusion, there may be mentioned olefin homopolymers and copolymers such as linear low-density polyethylene, low-density polyethylene, medium-density polyethylene, high-density polyethylene, ethylene-vinyl acetate copolymer, ionomers, ethylene-propylene copolymer, ethylene-acrylate ester copolymers, polypropylene, propylene- α-olefin (α-olefin containing 4 to 20 carbon atoms) copolymers, polybutene and polypentene, or polyolefin resins in a broader sense thereof such as olefin homopolymers and copolymers modified by grafting of an unsaturated carboxylic acid or an ester thereof. Mention may further be made of polyesters, polyamides, copolymerized polyamides, polyvinyl chloride, polyvinylidene chloride, acrylic resins, polystyrene, vinyl ester resins, polyester elastomers, polyurethane elastomers, chlorinated polyethylene, chlorinated polypropylene and the like. EVOH is also coextrudable. Among those mentioned above, polypropylene, polyamides, polyethylene, ethylene-vinyl acetate copolymer, polystyrene and polyesters are suitably used considering the ease of film forming by coextrusion, practicality of physical properties (especially strength) of the films, and other factors.

Further, in cases where a film or sheet or some other molding is once obtained from the EVOH pellets obtained by the present invention and then it is subjected to lamination by extrusion coating thereof with another substrate material or overlaying it with a film or sheet made of another substrate material using an adhesive, not only the thermoplastic resins mentioned above but also other arbitrary materials (e.g. paper, metal foils, uniaxially or biaxially oriented plastic films or sheets, woven fabrics, nonwoven fabrics, metallic cotton wool-like materials, woody materials) can be used.

When an EVOH layer is represented by a $(a_1, a_2, \ldots)$ and another substrate, for example a thermoplastic resin layer is represented by b $(b_1, b_2, \ldots)$, the layer constitution of the laminate, when it is a film, sheet or bottle-like article, may be not only the two-layer structure a/b but also any of arbitrary combinations such as b/a/b, a/b/a, $a_1/a_2/b$, $a/b_1/b_2$, $b_2/b_1/a/b_1/b_2$ and so on. When the laminate is filament-like, the a/b bimetal type, core (a)-sheath (b) type, core (b)-sheath (a) type, or eccentric core-sheath type and other arbitrary combinations are possible.

The above laminate may be used as it is. It is also desirable to subject the laminate to drawing treatment to further improve the physical properties thereof. The drawing may be uniaxial or biaxial and a draw ratio as high as possible is favorable to the physical properties, and oriented films, oriented sheets, stretched bottles and the like can be obtained without occurrence of pinhole formation, cracking, uneven drawing, delamination or the like in the step of drawing.

As regards the method of drawing, an appropriate method can be selected from among roll drawing, tenter drawing, tubular drawing, draw blowing and the like as well as deep draw forming, vacuum forming and the like, which bring about a high draw ratio. In the case of biaxial stretching, either the simultaneous biaxial stretching mode or the successive biaxial stretching mode can be employed. The drawing temperature is selected within the range of 80° C. to 170° C., preferably 100° C. to 160° C.

After completion of the drawing operation, thermal fixation is generally performed. The thermal fixation can be effected by well known means, and the above drawn film, while kept in a taut condition, is subjected to heat treatment at 80° C. to 170° C., preferably 100° C. to 160° C., for about 2 to 600 seconds.

For use in the field of heat shrinkage packaging of raw meat, processed meat, cheese and the like, the film after drawing is supplied as a product film without conducting thermal fixation. After wrapping such raw meat, processed meat, cheese or the like in said film, the film is thermally shrunk by carrying out heat treatment at 50° C. to 130° C., preferably 70° C. to 120° C., for about 2 to 300 seconds, to thereby attain tight and firm packaging.

The thus-obtained laminate may have any arbitrary shape and form. As examples, there may be mentioned films, sheets, tapes, bottles, pipes, filaments, contour extrusion products, etc. When necessary, the laminate obtained may be subjected to heat treatment, cooling treatment, rolling treatment, printing treatment, dry lamination treatment, solution or melt coating treatment, bag making treatment, deep drawing treatment, box making treatment, tube forming treatment, splitting treatment, etc.

The films, sheets, containers and the like as obtained in the above manner are particularly useful as packaging materials for containing foodstuffs, drugs, industrial chemicals, agrochemicals and other various materials to be packaged.

BEST MODE FOR CARRYING OUT THE INVENTION

EXAMPLES

The following examples illustrate the present invention concretely. In the following, unless otherwise specified, "part (s)" and "%" are respectively on the weight basis. "MI" means the melt index (g/10 min) as determined at 210° C. under a load of 2,160 g.

Example 1

To 100 parts of a methanol Solution containing 50% of an ethylene-vinyl acetate copolymer with an ethylene content of 35 mole percent was fed 150 parts of methanol containing 0.017 equivalent of sodium hydroxide relative to the vinyl acetate group in said copolymer. Then, 60 parts of a methanol/water mixed solvent prepared by mixing 100 parts of methanol with 50 parts of water was fed at the azeotropic point. The reaction temperature was 128° C. to 140° C. and the pressure was 5 kg/cm$^2$ G. The resulting EVOH solution (resin concentration: 40%) was a fully clear and uniform solution, and the degree of saponification of the vinyl acetate component was 99.8 mole percent.

Then, this EVOH solution was extruded in a strand form through a cylindrical nozzle having an aperture of 0.4 cm, a length of 6.0 cm and a thickness of 0.3 cm at a rate of 10 kg/hour into a coagulation bath containing 83 kg of a coagulation liquid composed of 5% methanol and 95% water and maintained at 5° C. and, after 30 seconds of contacting with the coagulation liquid, the strand was drawn out by means of a draw-out roller disposed at the end of the coagulation liquid bath (coagulation liquid/EVOH strand weight ratio: 1,000). There were 10 nozzle openings, and the number of strands was 10.

The strand after coagulation was cut by means of a cutter to give porous pellets. The porous pellets obtained were uniform in shape and form and there were no deformed pellets at all. These pellets were deprived of sodium acetate by four repetitions of washing with water in a water bath maintained at a temperature of 30° C. for 1 hour. After further washing in acetic acid-water at a temperature of 30° C. for 1 hour, the pellets were dried, whereupon desired pellets (white pellets, 3.8 mm in diameter and 4 mm in length) were obtained. Regarding the above production process, the following items were evaluated.

(1) Strand Evaluation

1) Hardening (hardness)

The strand just drawn out of the coagulation liquid was tested for hardness according to JIS K 6301 using a spring type hardness tester (product of Shimadzu Corp.), evaluated according to the following criteria.

○: Not less than 30;

Δ: Not less than 25 but less than 30;

×: Less than 25.

2) Strand Breakage

The number of strands broken out of the 10 strands was counted during 72 hours of operation.

3) Pellet Size Precision 100 pellets were measured for diameter and length using a pair of calipers, and the proportion of those pellets having a diameter and length within the range of mean ±0.2 mm was determined and evaluated according to the following criteria.

⊚: Not less than 95%;

○: Not less than 80% but less than 95%;

Δ: Not less than 60% but less than 80%;

×: Less than 60%.

Example 2

Pellets were produced and evaluated in the same manner as in Example 1 except that the amount of the coagulation liquid was adjusted so that the coagulation liquid/EVOH strand weight ratio amounted to 5,000.

Example 3

Pellets were produced and evaluated in the same manner as in Example 1 except that the strand/coagulation liquid contact time was adjusted to 5 minutes and the coagulation liquid/EVOH strand weight ratio to 100.

Example 4

Pellets were produced and evaluated in the same manner as in Example 1 except that the strand/coagulation liquid contact time was adjusted to 20 seconds and the coagulation liquid/EVOH strand weight ratio to 1,490.

Comparative Example 1

Pellets were produced and evaluated in the same manner as in Example 1 except that the coagulation liquid/EVOH strand weight ratio was adjusted to 30 by reducing the amount of the coagulation liquid.

Comparative Example 2

Pellets were produced and evaluated in the same manner as in Example 1 except that the coagulation liquid/EVOH strand weight ratio was adjusted to 12,000 by increasing the amount of the coagulation liquid.

The evaluation results obtained in Examples 1 to 4 and Comparative Examples 1 and 2 are shown in Table Table 1.

TABLE 1

|  | Hardening (hardness) | Strand breakage (number of occurrences) | Pellet size precision |
|---|---|---|---|
| Example 1 | ◯ | 0 | ◉ |
| Example 2 | ◯ | 0 | ◉ |
| Example 3 | ◯ | 0 | ◯ |
| Example 4 | ◯ | 0 | ◉ |
| Comparative Example 1 | X | 8 | X |
| Comparative Example 2 | ◯ | 0 | X |

Example 5

To 100 parts of a 50% methanolic solution containing an ethylene-vinyl acetate copolymer with an ethylene content of 35 mole percent was fed 150 parts of a methanol solution containing 0.017 equivalent, relative to the vinyl acetate group in said copolymer, of sodium hydroxide, and the saponification reaction was carried out at 118° C. to 130° C. and a pressure of 4 kg/cm² G for 30 minutes. The resulting methanol solution of EVOH (degree of saponification: 99.8 mole percent) had a resin concentration of 30%.

Then, 60 parts of an aqueous methanol solution with a water content of 62.5% was fed to the above methanol solution of EVOH at the azeotropic point, and the methanol was distilled off at 100° C. to 110° C. and a pressure of 3 kg/cm² G until the resin concentration in the EVOH solution in methanol/water became 40%, whereupon a completely clear, uniform methanol/water solution was obtained.

Then, the EVOH solution in methanol/water as obtained was extruded in a strand form at a rate of 10 kg/hr into a coagulation liquid bath comprising water/methanol (weight ratio: 95/5) containing 50 ppm of acetic acid and maintained at 5° C. through a cylindrical nozzle with an inside diameter of 0.3 cm and a length of 6.0 cm. The resulting strand was drawn out of the coagulation liquid by means of a draw-out roller provided at the end of the coagulation liquid bath so that the residence time in the coagulation liquid amounted to 3 minutes. There were 10 nozzle openings, and the number of strands was 10.

The strand after coagulation was cut by means of a cutter to give porous pellets. The pellets obtained were uniform in shape and form and there were no deformed pellets at all. These pellets were deprived of sodium acetate by four repetitions of washing with water in a water bath maintained at a temperature of 30° C. for 1 hour. After further washing in acetic acid-water at a temperature of 30° C. for 1 hour, the pellets were dried, whereupon desired saponified ethylene-vinyl acetate copolymer pellets (white cylindrical pellets, 3.8 mm in average diameter and 4 mm in average length) were obtained.

For the above production process, the following items were evaluated.
(1) Strand Evaluation
1) Hardening Time The strand immersed in the coagulation liquid was drawn out at timed intervals, and the time required for the hardness to reach 30 was determined and evaluated according to the criteria given below. The hardness measurement was made according to JIS K 6301 using a spring type hardness tester (product of Shimadzu Corp.).

◯: Less than 40 seconds;

Δ: Less than 60 seconds but not less than 40 seconds;

×: 60 seconds or longer.

2) Strand Breakage

The number of strands broken out of the 10 strands was counted during 120 hours of operation.

3) Pellet Size Precision 100 pellets were measured for diameter and length using a pair of calipers, and the proportion of those pellets having a diameter within the range of 3.8 mm±0.2 mm and a length within the range of 4 mm ±0.2 mm was determined and evaluated according to the following criteria.

◉: Not less than 95%;

◯: Not less than 90% but less than 95%;

Δ: Not less than 80% but less than 90%;

×: Less than 80%.

Example 6

Pellets were produced and evaluated in the same manner as in Example 5 except that the content of acetic acid in the coagulation liquid was adjusted to 1,000 ppm.

Example 7

Pellets were produced and evaluated in the same manner as in Example 5 except that methyl acetate was used as the coagulation liquid.

Example 8

Pellets were produced and evaluated in the same manner as in Example 5 except that propionic acid was used in lieu of acetic acid.

Example 9

Pellets were produced and evaluated in the same manner as in Example 5 except that 50 ppm of methyl acetate was used in lieu of acetic acid.

Example 10

Pellets were produced and evaluated in the same manner as in Example 9 except that the composition of the coagulation liquid was adjusted so that the content of methyl acetate in the coagulation liquid amount to 1,000 ppm.

Example 11

Pellets were produced and evaluated in the same manner as in Example 5 except that 100 ppm of sodium acetate was used in lieu of acetic acid.

Example 12

Pellets were produced and evaluated in the same manner as in Example 11 except that the composition of the coagulation liquid was adjusted so that the content of sodium acetate in the coagulation liquid amount to 400 ppm.

Comparative Example 3

Pellets were produced and evaluated in the same manner as in Example 5 except that the content of acetic acid in the coagulation liquid was 0 ppm.

Comparative Example 4

Pellets were produced and evaluated in the same manner as in Example 5 except that the content of acetic acid in the coagulation liquid was 20,000 ppm.

Comparative Example 5

Pellets were produced and evaluated in the same manner as in Example 9 except that the content of methyl acetate in the coagulation liquid was 0 ppm.

Comparative Example 6

Pellets were produced and evaluated in the same manner as in Example 9 except that the content of methyl acetate in the coagulation liquid was 70,000 ppm.

Comparative Example 7

Pellets were produced and evaluated in the same manner as in Example 11 except that the content of sodium acetate in the coagulation liquid was 0 ppm.

Comparative Example 8

Pellets were produced and evaluated in the same manner as in Example 11 except that the content of sodium acetate in the coagulation liquid was 20,000 ppm.

The evaluation results obtained in Examples 5 to 12 and Comparative Examples 3 to 8 are shown in Table 2. In these Example 5 to 12 and Comparative Examples 3 to 8, the coagulation liquid/EVOH strand weight ratio was always 300.

TABLE 2

|  | Hardening (hardness) | Strand breakage (number of occurrences) | Pellet size precision |
|---|---|---|---|
| Example 5 | ◯ | 0 | ◎ |
| Example 6 | ◯ | 0 | ◎ |
| Example 7 | ◯ | 0 | ◎ |
| Example 8 | ◯ | 0 | ◯ |
| Example 9 | ◯ | 0 | ◎ |
| Example 10 | ◯ | 0 | ◎ |
| Example 11 | ◯ | 0 | ◎ |
| Example 12 | ◯ | 0 | ◎ |
| Comparative Example 3 | X | 1 | ◯ |
| Comparative Example 4 | X | 2 | X |
| Comparative Example 5 | X | 1 | ◯ |
| Comparative Example 6 | X | 2 | X |
| Comparative Example 7 | X | 1 | ◯ |
| Comparative Example 8 | X | 2 | X |

Example 13

A water/methanol (weight ratio: 40/60) solution of EVOH [ethylene content: 35 mole percent; degree of saponification: 99.5 mole percent; MI: 12] (A) (60° C.; EVOH concentration: 45%) was extruded for coagulation in a strand form into a water bath maintained at 5° C. and then the strand was cut with a cutter to give pellet-form (4 mm in diameter, 4 mm in length) EVOH. The EVOH pellets were further placed in warm water at 30° C. and, after about 4 hours of stirring, a porous precipitate with a water content of 50% (with micropores having a mean diameter of 4 µm being uniformly dispersed therein).

Then, 100 parts of the porous precipitate was placed in 200 parts of a 0.08% aqueous boric acid (B) solution (0.064 part of boric acid (B) per 100 parts of total water) and the mixture was stirred at 30° C. for 5 hours, whereupon a resin composition composed of EVOH (A) and the boron compound (B) [containing 0.038 part, as calculated as boron, of the boron compound (B) per 100 parts of EVOH (A)] was obtained.

The resin composition (porous pellets) obtained was subjected to drying treatment in the following manner.
<Fluidized Drying Step>

The resin composition obtained in the above was dried for about 3 hours using a fluidized bed drier (tower type) for batchwise operation while said composition was fluidized by means of nitrogen at 75° C., to give a resin composition with a water content of 20%. The water content of the resin composition before fluidized drying was 50%, hence the difference in water content between the resin composition before fluidized drying and that after drying was 30%.
<Stationary Drying>

The resin composition after the above fluidized drying treatment was dried for about 18 hours using a box type drier for batchwise operation (ventilation type) under nitrogen gas at 125° C. to give a desired resin composition with a water content of 0.3% [containing 0.038 part, on the boron basis, of the boron compound (B) per 100 parts of EVOH (A)].
<Laminate Formation>

The resin composition obtained was then fed to a multi-layer extruder equipped with a feed block 5-layer T die, to give a multilayer laminate comprising 3 kinds of material and 5 layers, namely comprising polyethylene layer (Mitsubishi Chemical's Novatec LD LF525H)/adhesive resin layer (Mitsubishi Chemical's Modic AP240H)/resin composition layer/adhesive resin layer (ditto)/polyethylene layer (ditto) (50/10/20/10/50 (µm) in length), which was subjected to evaluation for formation of minute fish eyes smaller in diameter than 0.1 mm and for long-run moldability in the following manner.
<Fish Eyes>

The above film (10 cm×10 cm) just after molding was observed by the eye and evaluated for occurrence of fish eyes smaller in diameter than 0.1 mm, as follows.

◎: 0 to 3 fish eyes;

◯: 4 to 10 fish eyes;

Δ: 11 to 50 fish eyes;

×: 51 or more fish eyes.
<Long-run Moldability>

The above molding procedure was continued for 10 days and the molded film obtained last was observed by the eye in the same manner as above to examine the increase in number of fish eyes, which was evaluated as follows.

◯: No increase was observed;

Δ: A light increase was observed;

×: A marked increase was observed.

Example 14

A solution of EVOH [ethylene content: 40 mole percent; degree of saponification: 99.0 mole percent; MI: 6] (A) in water/methanol (water/methanol mixing ratio =20/80 by weight] (60° C.) was extruded in a strand form into a water bath maintained at 5° C. After coagulation, the strand was cut with a cutter to give pellet-form (4 mm in diameter and 4 mm in length) EVOH. The EVOH pellets were washed with warm water at 30° C. and then placed in an aqueous acetic acid solution. After about 2 hours of stirring, a porous precipitate with a water content of 55% (with micropores having a mean size of 5 µm occurring uniformly therein) was obtained.

Then, 100 parts of the porous precipitate obtained was placed in 300 parts of a 0.05% aqueous solution of borax (sodium tetraborate decahydrate) (B) (0.42 part of borax (B) per 100 parts of total water), and the mixture was stirred at 30 for 5 hours to give resin composition pellets composed of EVOH (A) and the boron compound (B) [containing 0.032 part, on the boron basis, of the boron compound per 100 parts of EVOH (A)].

The resin composition pellets obtained were subjected to drying treatment in the following manner.
<Fluidized Drying Step>
The resin composition pellets obtained in the above was dried for about 3 hours using a fluidized bed drier (horizontal multichamber type for continuous operation) while said composition was fluidized by means of nitrogen at 75° C., to give a resin composition with a water content of 20%. The water content of the resin composition before fluidized drying was 55%, hence the difference in water content between the resin composition before fluidized drying and that after drying was 35%.
<Stationary Drying>
The resin composition pellets after the above fluidized drying treatment was dried for about 24 hours using a box type drier for batchwise operation (ventilation type) under nitrogen gas at 120° C. to give a desired resin composition pellets with a water content of 0.2% [containing 0.032 part, on the boron basis, of the boron compound (B) per 100 parts of EVOH (A)].

Example 15

Resin composition pellets as desired [containing 0.038 part, on the boron basis, of the boron compound (B) per 100 parts of EVOH (A)] were obtained proceeding in the same manner as in Example 13 except that drying treatment was carried out by modifying the drying treatment process as follows.
<Stationary Drying Step>
The resin composition pellets obtained were dried for about 5 hours under nitrogen gas at 70° C. using a box type drier for batchwise operation (ventilation type), to give resin composition pellets with a water content of 30%. The water content of the resin composition pellets before stationary drying was 50%, hence the difference in water content between the resin composition pellets before stationary drying and that after drying was 20%.
<Fluidized Drying>
The resin composition pellets after the above stationary drying treatment were dried for about 18 hours while they were fluidized by means of nitrogen gas at 120° C. using a box type drier for batchwise operation (ventilation type), to give desired resin composition pellets with a water content of 0.2% [containing 0.038 part, on the boron basis, of the boron compound (B) per 100 parts of EVOH (A)].

Example 16

A solution of EVOH [ethylene content: 30 mole percent; degree of saponification: 99.6 mole percent; MI: 12] (A) in water/methanol (water/methanol mixing ratio=50/50 by weight] (60° C.) was extruded in a strand form into a water bath maintained at 5° C. After coagulation, the strand was cut with a cutter to give pellet-form (4 mm in diameter and 5 mm in length) EVOH. Said EVOH pellets were further washed with warm water at 30° C. and then placed in an aqueous acetic acid solution. After about 2 hours of stirring, a porous precipitate with a water content of 50% (with micropores having a mean diameter of 4 µm occurring uniformly therein) was obtained.

Then, 100 parts of the porous precipitate obtained was placed in 250 parts of a 0.06% aqueous solution of sodium diborate (B), and the mixture was stirred at 30° C. for 4 hours to give resin composition pellets composed of EVOH (A) and sodium diborate (B) [containing 0.02 part, on the boron basis, of the boron compound per 100 parts of EVOH (A)].

The resin composition pellets obtained were subjected to drying treatment in the following manner.
<Stationary Drying Step>
The resin composition pellets obtained were dried for about 8 hours under nitrogen gas at 70° C. using a box type ventilation drier for batchwise operation to give resin composition pellets with a water content of 25%. The water content of the resin composition before stationary drying was 50%, hence the difference in water content between the resin composition before stationary drying and that after drying was 25%.
<Fluidized Drying>
The resin composition pellets after the above stationary drying treatment were dried for about 18 hours while they were fluidized by means of nitrogen gas at 125° C. using a tower type fluidized bed drier for batchwise operation, to give desired resin composition pellets with a water content of 0.3% [containing 0.02 part, on the boron basis, of the boron compound (B) per 100 parts of EVOH (A)].

Example 17

The porous precipitate obtained in Example 13 (100 parts) were placed in 200 parts of a 0.05% aqueous solution of calcium acetate (B) (0.04 part of calcium acetate (B) per 100 parts of total water), and the mixture was stirred at 30° C. for 5 hours to give resin composition pellets composed of EVOH (A) and the acetic acid salt (B) [containing 0.008 part, on the calcium basis, of the acetic acid salt (B) per 100 parts of EVOH (A)].

The resin composition pellets obtained were subjected to drying treatment in the same manner as in Example 13 to give desired resin composition pellets with a water content of 0.3% [containing 0.008 part, on the calcium basis, of the acetic acid salt (B) per 100 parts of EVOH (A)].

Example 18

The porous precipitate obtained in Example 14 (100 parts) were placed in 300 parts of a 0.06% aqueous solution of potassium acetate (B) (0.05 part of potassium acetate (B) per 100 parts of total water), and the mixture was stirred at 30° C. for 5 hours to give resin composition pellets composed of EVOH (A) and the acetic acid salt (B) [containing 0.01 part, on the potassium basis, of the acetic acid salt (B) per 100 parts of EVOH (A)].

The resin composition pellets obtained were subjected to drying treatment in the same manner as in Example 14 to give desired resin composition pellets with a water content of 0.2% [(containing 0.01 part, on the potassium basis, of the acetic acid salt (B) per 100 parts of EVOH (A)].

Example 19

Desired resin composition pellets were obtained in the same manner as in Example 17 except that drying treatment was carried out by modifying the drying treatment process as follows.

<Stationary Drying Step>

The resin composition pellets obtained were dried for about 5 hours under nitrogen gas at 70° C. using a box type drier for batchwise operation (ventilation type), to give resin composition pellets with a water content of 30%. The water content of the resin composition before stationary drying was 50%, hence the difference in water content between the resin composition before stationary drying and that after drying was 20%.

<Fluidized Drying>

The resin composition pellets after the above stationary drying treatment were dried for about 18 hours while they were fluidized by means of nitrogen gas at 120° C. using a box type drier for batchwise operation (ventilation type), to give desired resin composition pellets with a water content of 0.2%.

Example 20

The porous precipitate obtained in Example 16 (100 parts) were placed in 250 parts of a 0.06% aqueous solution of sodium acetate (B), and the mixture was stirred at 30° C. for about 4 hours to give resin composition pellets composed of EVOH (A) and the acetic acid salt (B) [containing 0.015 part, on the sodium basis, of the acetic acid salt (B) per 100 parts of EVOH (A)].

The resin composition pellets obtained were subjected to drying treatment in the same manner as in Example 16 to give desired resin composition pellets with a water content of 0.3% [containing 0.015 part, on the sodium basis, of the acetic acid salt (B) per 100 parts of EVOH (A)].

Example 21

The porous precipitate obtained in Example 13 (100 parts) were placed in 200 parts of a 0.06% aqueous solution of magnesium dihydrogen phosphate (B) (0.048 part of magnesium dihydrogen phosphate (B) per 100 parts of total water), and the mixture was stirred at 30° C. for 5 hours to give resin composition pellets composed of EVOH (A) and the phosphoric acid compound (B) [containing 0.012 part, on the phosphate radical basis, of the phosphoric acid compound (B) per 100 parts of EVOH (A)].

The resin composition pellets obtained were subjected to drying treatment in the same manner as in Example 13 to give desired resin composition pellets with a water content of 0.3% [containing 0.012 part, on the phosphate radical basis, of the phosphoric acid compound (B) per 100 parts of EVOH (A)].

Example 22

The porous precipitate obtained in Example 14 (100 parts) were placed in 300 parts of a 0.007% aqueous solution of calcium dihydrogen phosphate (B) (0.006 part of magnesium dihydrogen phosphate (B) per 100 parts of total water), and the mixture was stirred at 30° C. for 5 hours to give resin composition pellets composed of EVOH (A) and the phosphoric acid compound (B) [containing 0.002 part, on the phosphate radical basis, of the phosphoric acid compound (B) per 100 parts of EVOH (A)].

The resin composition pellets obtained were subjected to drying treatment in the same manner as in Example 14 to give desired resin composition pellets with a water content of 0.2% [containing 0.002 part, on the phosphate radical basis, of the phosphoric acid compound (B) per 100 parts of EVOH (A)].

Example 23

Desired resin composition pellets [containing 0.011 part, on the phosphate radical basis, of the phosphoric acid compound (B) per 100 parts of EVOH (A)] were obtained in the same manner as in Example 21 except that drying treatment was carried out by modifying the drying treatment process as follows.

<Stationary Drying Step>

The resin composition pellets obtained were dried for about 5 hours under nitrogen gas at 70° C. using a box type drier for batchwise operation (ventilation type), to give resin composition pellets with a water content of 30%. The water content of the resin composition before stationary drying was 50%, hence the difference in water content between the resin composition before stationary drying and that after drying was 20%.

<Fluidized Drying>

The resin composition pellets after the above stationary drying treatment were dried for about 18 hours while they were fluidized by means of nitrogen gas at 120° C. using a box type drier for batchwise operation (ventilation type), to give desired resin composition pellets with a water content of 0.2%.

Example 24

Desired resin composition pellets were obtained in the same manner as in Example 21 except that 0.03 part of sodium dihydrogen phosphate was used in lieu of magnesium dihydrogen phosphate (B) to give resin composition pellets before drying which contained 0.009 part, on the phosphate radical basis, of the phosphoric acid compound (B) per 100 parts of EVOH (A) and that drying treatment was carried out by modifying the drying treatment process as follows.

<Stationary Drying Step>

The resin composition pellets obtained were dried for about 5 hours under nitrogen gas at 70° C. using a box type drier for batchwise operation (ventilation type), to give resin composition pellets with a water content of 30%. The water content of the resin composition pellets before stationary drying was 50%, hence the difference in water content between the resin composition pellets before stationary drying and that after drying was 20%.

<Fluidized Drying>

The resin composition pellets after the above stationary drying treatment were dried for about 18 hours while they were fluidized by means of nitrogen gas at 120° C. using a box type drier for batchwise operation (ventilation type), to give desired resin composition pellets with a water content of 0.2% [containing 0.009 part, on the phosphate radical basis, of the phosphoric acid compound (B) per 100 parts of EVOH (A)].

Example 25

The porous precipitate obtained in Example 16 (100 parts) were placed in 250 parts of a 0.06% aqueous solution of magnesium dihydrogen phosphate (B), and the mixture was stirred at 30° C. for about 4 hours to give resin composition pellets composed of EVOH (A) and magnesium dihydrogen phosphate (B) [containing 0.010 part, on the phosphate radical basis, of the phosphoric acid compound (B) per 100 parts of EVOH (A)].

The resin composition pellets obtained were subjected to drying treatment in the same manner as in Example 16 to give desired resin composition pellets with a water content of 0.3% [containing 0.010 part, on the phosphate radical basis, of the phosphoric acid compound (B) per 100 parts of EVOH (A)].

Comparative Example 9

Following the procedure of Example 13 but adjusting the water content of the porous EVOH (A) precipitate to 10%, resin composition pellets [containing 0.044 part, on the boron basis, of the boron compound (B) per 100 parts of EVOH (A)] were obtained and dried under the same conditions.

The water content of the resin composition pellets after fluidized drying treatment was 6%, and the final water content of the resin composition pellets after stationary drying treatment [containing 0.044 part, on the boron basis, of the boron compound (B) per 100 parts of EVOH (A)] was 0.1%.

Comparative Example 10

Following the procedure of Example 13 but adjusting the water content of the porous post-saponification EVOH (A) precipitate from the water/methanol solution to 90%, resin composition pellets [containing 0.011 part, on the boron basis, of the boron compound (B) per 100 parts of EVOH (A) ] were obtained and dried under the same conditions.

The water content of the resin composition pellets after fluidized drying treatment was 30%, and the final water content of the resin composition pellets after stationary drying treatment [containing 0.011 part, on the boron basis, of the boron compound (B) per 100 parts of EVOH (A)] was 0.3%.

Comparative Example 11

Following the procedure of Example 13 but adjusting the amount of the boron compound (B) to 0.0005 part per 100 parts of total water, resin composition pellets [containing 0.0003 part, on the boron basis, of the boron compound (B) per 100 parts of EVOH (A)] were obtained and dried under the same conditions.

The water content of the resin composition pellets after fluidized drying treatment was 20%, and the final water content of the resin composition pellets after stationary drying treatment [containing 0.0005 part, on the boron basis, of the boron compound (B) per 100 parts of EVOH (A)] was 0.3%.

Comparative Example 12

Following the procedure of Example 13 but adjusting the amount of the boron compound (B) to 1 part per 100 parts of total water, resin composition pellets [containing 0.1 part, on the boron basis, of the boron compound (B) per 100 parts of EVOH (A)] were obtained and dried under the same conditions.

The water content of the resin composition pellets after fluidized drying treatment was 20%, and the final water content of the resin composition pellets after stationary drying treatment [containing 0.1 part, on the boron basis, of the boron compound (B) per 100 parts of EVOH (A)] was 0.3%.

Comparative Example 13

Following the procedure of Example 17 but adjusting the water content of the porous EVOH (A) precipitate to 10%, resin composition pellets [containing 0.01 part, on the calcium basis, of the acetic acid salt (B) per 100 parts of EVOH (A)] were obtained and dried under the same conditions.

The water content of the resin composition pellets after fluidized drying treatment was 6%, and the final water content of the resin composition pellets after stationary drying treatment [containing 0.01 part, on the calcium basis, of the acetic acid salt (B) per 100 parts of EVOH (A)] was 0.1%.

Comparative Example 14

Following the procedure of Example 17 but adjusting the water content of the porous post-saponification EVOH (A) precipitate from the water/methanol solution to 90%, resin composition pellets [containing 0.005 part, on the calcium basis, of the acetic acid salt (B) per 100 parts of EVOH (A)] were obtained and dried under the same conditions.

The water content of the resin composition pellets after fluidized drying treatment was 30%, and the final water content of the resin composition pellets after stationary drying treatment [containing 0.005 part, on the calcium basis, of the acetic acid salt (B) per 100 parts of EVOH (A)] was 0.3%.

Comparative Example 15

Following the procedure of Example 17 but adjusting the amount of the acetic acid salt (B) to 0.0005 part per 100 parts of total water, resin composition pellets [containing 0.0006 part, on the calcium basis, of the acetic acid salt (B) per 100 parts of EVOH (A)] were obtained and dried under the same conditions.

The water content of the resin composition pellets after fluidized drying treatment was 20%, and the final water content of the resin composition pellets after stationary drying treatment [containing 0.0006 part, on the calcium basis, of the acetic acid salt (B) per 100 parts of EVOH (A)] was 0.3%.

Comparative Example 16

Following the procedure of Example 17 but adjusting the amount of the acetic acid salt (B) to 1 part per 100 parts of total water, resin composition pellets [containing 0.1 part, on the calcium basis, of the acetic acid salt (B) per 100 parts of EVOH (A)] were obtained and dried under the same conditions.

The water content of the resin composition pellets after fluidized drying treatment was 20%, and the final water content of the resin composition pellets after stationary drying treatment [containing 0.1 part, on the calcium basis, of the acetic acid salt (B) per 100 parts of EVOH (A)] was 0.3%.

Comparative Example 17

Following the procedure of Example 21 but adjusting the water content of the porous EVOH (A) precipitate to 10%, resin composition pellets [containing 0.024 part, on the phosphate radical basis, of the phosphoric acid compound (B) per 100 parts of EVOH (A)] were obtained and dried under the same conditions.

The water content of the resin composition pellets after fluidized drying treatment was 6%, and the final water content of the resin composition pellets after stationary drying treatment [containing 0.024 part, on the phosphate radical basis, of the phosphoric acid compound (B) per 100 parts of EVOH (A)] was 0.1%.

Comparative Example 18

Following the procedure of Example 21 but adjusting the water content of the porous post-saponification EVOH (A) precipitate from the water/methanol solution to 90%, resin composition pellets [containing 0.002 part, on the phosphate radical basis, of the phosphoric acid compound (B) per 100 parts of EVOH (A)] were obtained and dried under the same conditions.

The water content of the resin composition pellets after fluidized drying treatment was 30%, and the final water content of the resin composition pellets after stationary drying treatment [containing 0.002 part, on the phosphate radical basis, of the phosphoric acid compound (B) per 100 parts of EVOH (A)] was 0.3%.

Comparative Example 19

Following the procedure of Example 21 but adjusting the amount of the phosphoric acid compound (B) to 0.00005 part per 100 parts of total water, resin composition pellets [containing not more than 0.0001 part, on the phosphate radical basis, of the phosphoric acid compound (B) per 100 parts of EVOH (A)] were obtained and dried under the same conditions.

The water content of the resin composition pellets after fluidized drying treatment was 20%, and the final water content of the resin composition pellets after stationary drying treatment [containing not more than 0.0001 part, on phosphate radical basis, of the phosphoric acid compound (B) per 100 parts of EVOH (A)] was 0.3%.

Comparative Example 20

Following the procedure of Example 21 but adjusting the amount of the phosphoric acid compound (B) to 2 parts per 100 parts of total water, resin composition pellets [containing 0.25 part, on the phosphate radical basis, of the phosphoric acid compound (B) per 100 parts of EVOH (A)] were obtained and dried under the same conditions.

The water content of the resin composition pellets after fluidized drying treatment was 20%, and the final water content of the resin composition pellets after stationary drying treatment [containing 0.25 part, on phosphate radical basis, of the phosphoric acid compound (B) per 100 parts of EVOH (A)] was 0.3%.

The results of evaluation of the pellets after drying as obtained in Examples 13 to 25 and Comparative Examples 9 to 20 are summarized in Table 3. In these Examples 13 to 25 and Comparative Examples 9 to 20, the coagulation liquid/strand weight ratio was always set at 500.

TABLE 3

|  | Fish eyes | Long-run moldability |
| --- | --- | --- |
| Example 13 | ⊚ | ◯ |
| Example 14 | ⊚ | ◯ |
| Example 15 | ⊚ | ◯ |
| Example 16 | ⊚ | ◯ |
| Example 17 | ⊚ | ◯ |
| Example 18 | ⊚ | ◯ |
| Example 19 | ⊚ | ◯ |
| Example 20 | ⊚ | ◯ |
| Example 21 | ⊚ | ◯ |
| Example 22 | ⊚ | ◯ |
| Example 23 | ⊚ | ◯ |
| Example 24 | ⊚ | ◯ |
| Example 25 | ⊚ | ◯ |
| Comparative Example 9 | X | Δ |
| Comparative Example 10 | Δ | X |
| Comparative Example 11 | ◯ | X |
| Comparative Example 12 | X | X |
| Comparative Example 13 | X | Δ |
| Comparative Example 14 | Δ | X |
| Comparative Example 15 | ◯ | X |
| Comparative Example 16 | X | X |
| Comparative Example 17 | X | Δ |
| Comparative Example 18 | Δ | X |
| Comparative Example 19 | ◯ | X |
| Comparative Example 20 | X | X |

Example 26

A methanol/water (weight ratio: 50/50) solution of EVOH [ethylene content: 35 mole percent; degree of saponification: 99.5 mole percent] as adjusted to a liquid temperature of 50° C. was extruded in a strand from through a nozzle into a water bath maintained at 5° C. After complete coagulation, the strand-like matter was drawn out of the water bath via a draw-out roller provided at the end of said bath and cut by means of a cutter to give pellets (1), 4 mm in diameter and 4 mm in length. The pellets were further placed in warm water at 30° C. and the whole was stirred for 4 hours to give EVOH pellets (2) with a water content of 50%. Said pellets (2) were then placed in a 0.2% aqueous solution of boric acid and, after 5 hours of stirring at 30° C., pellets (3) with a water content of 50% were obtained. The boric acid content in said pellets (3) was 0.03 part (calculated as boron) per 100 parts of EVOH. Said pellets (3) were subjected to the following primary and secondary drying steps to give dried pellets.

<Primary Drying Step>

In a tower type fluidized bed drier for batchwise operation, the pellets (3) were dried for 3 hours while nitrogen gas at 75° C. was passed over the surface of the pellets at a rate of 2.0 m/sec, to give pellets (4) with a water content of 20%. The difference in water content between the content before primary drying and that after primary drying was 30%.

<Secondary Drying Step>

Then, in a ventilation type box drier for batchwise operation, the above pellets (4) were dried for 18 hours while nitrogen gas at 125° C. was passed over the surface of the pellets at a rate of 0.3 m/sec, to give dried pellets with a water content of 0.3%.

<Laminate Formation>

The dried pellets obtained were fed as an interlayer to a multilayer extruder equipped with a feed block 5-layer T die, and a multilayer laminate (film) comprising 3 kinds of material and 5 layers was produced using polyethylene (Mitsubishi Chemical's Novatec LD LF525H) and an adhesive resin (Mitsubishi Chemical's Modic AP240H) under the conditions given below. Said laminate had the constitution polyethylene layer/adhesive resin layer/layer of the above EVOH/adhesive resin layer/polyethylene layer (50/10/20/10/50 ($\mu$m) in thickness) and was subjected to evaluation by counting fish eyes. Further, after 96 hours of continuous operation, the fluctuation in torque and the change in EVOH layer thickness were then evaluated.

(Extrusion Conditions)

| EVOH extruder | |
|---|---|
| Screw inside diameter | 32 mm |
| L/D | 28 |
| Screw compression ratio | 3.2 |
| Cylinder temperature | $C_1$: 200° C. |
| | $C_2$: 220° C. |
| | $C_3$: 220° C. |
| Polyethylene extruder | |
| Screw inside diameter | 65 mm |
| Cylinder temperature | $C_1$: 190° C. |
| | $C_2$: 210° C. |
| | $C_3$: 220° C. |
| | $C_4$: 220° C. |
| Adhesive resin extruder | |
| Screw inside diameter | 32 mm |
| Cylinder temperature | $C_1$: 190° C. |
| | $C_2$: 220° C. |
| | $C_3$: 220° C. |
| Multilayer die | feed block type |
| Die width | 650 mm |
| Die temperature | H: 220° C. |
| | D: 220° C. |

<Fish Eye Measurement>
The above film (10 cm×10 cm) just after molding was observed by the eye and evaluated for occurrence of minute fish eyes as follows.

⊚: 0 to 3 fish eyes;

○: 4 to 10 fish eyes;

Δ: 11 to 50 fish eyes;

×: 51 or more fish eyes.

(Torque Fluctuation)

During the continuous film formation, the fluctuation in screw torque A (in amperes) under the motor load (number of screw revolutions: 40 rpm) on the EVOH extruder was evaluated as follows.

○: Fluctuations less than 5%;

Δ: Fluctuations not less than 5% but less than 10%;

×: Fluctuations not less than 10%.

(EVOH Layer Thickness Change)

Films were sampled at intervals of 1 hour and the EVOH layer thickness was measured by observing the section in the machine direction (MD) under a microscope, and the degree of variation was determined with 20 μm being taken as the center value and evaluated as follows.

○: Degree of variation less than ±5%;

Δ: Degree of variation not less than ±5% but less than ±10%;

×: Degree of variation not less than ±10%.

Example 27

Pellets (4) with a water content of 22% were obtained in the same manner as in the primary drying step in Example 26 except that a fluidized bed drier (horizontal multichamber type for continuous operation) and that nitrogen gas was passed over the surface of pellets (3) at a rate of 1.5 m/sec. The difference in water content as compared with that before primary drying was 28%. The secondary drying step was performed in the same manner as in Example 26 to give dried pellets with a water content of 0.3%.

Example 28

Dried pellets with a water content of 0.3% were obtained in the same manner as in Example 26 except that, in the secondary drying step, a rotary drier for batchwise operation was used and nitrogen gas at 125° C. was passed over the surface of pellets (4) at a rate of 0.08 m/sec.

Example 29

EVOH pellets were prepared and treated in the same manner as in Example 26 except that a 0.03% aqueous calcium acetate solution was used in lieu of the 0.2% aqueous boric acid solution. The calcium acetate content in the pellets before drying was 0.0075 part (calculated as calcium) per 100 parts of EVOH. Primary and secondary drying were carried out in the same manner as in Example 26 to give dried pellets with a water content of 0.3%.

Example 30

EVOH pellets were prepared and treated in the same manner as in Example 26 except that a 0.02% aqueous magnesium dihydrogen phosphate solution was used in lieu of the 0.2% aqueous boric acid solution. The magnesium dihydrogen phosphate content in the pellets before drying was 0.018 part (calculated as phosphate radical) per 100 parts of EVOH. Primary drying and secondary drying were carried out in the same manner as in Example 26 to give dried pellets with a water content of 0.3%.

Example 31

Pellets (2) were obtained in the same manner as in Example 26. Without performing boric acid treatment, they were subjected to primary drying and secondary drying in the same manner as in Example 26 to give dried pellets with a water content of 0.3%.

Example 32

Pellets (2) were obtained in the same manner as in Example 26. Said pellets (2) were placed in a 0.2% aqueous solution of boric acid, and the mixture was stirred at 30° C. for 5 hours to give pellets (3) with a water content of 100 parts (relative to 100 parts of EVOH). The boric acid content in said pellets (3) was 0.03 part (calculated as boron) per 100 parts of EVOH. Said pellets (3) were submitted to the following primary and secondary drying steps to give dried pellets.

<Primary Drying Step>

In a fluidized bed drier for batchwise operation, drying was carried out with nitrogen gas at 75° C. for 3 hours to give pellets (4) with a water content of 25 parts (relative to 100 parts of EVOH). In this case, the average rate of drying was 25 parts per hour.

<Secondary Drying Step>

Then, in a ventilation type box drier for batchwise operation, the above pellets (4) were dried for 18 hours using nitrogen gas at 125° C. to give pellets (4) with a water content of 0.3 part (relative to 100 parts of EVOH) In this case, the average rate of drying was 1.37 parts per hour.

Example 33

Dried pellets with a water content of 0.3 part (relative to 100 parts of EVOH) were obtained in the same manner as in Example 32 except that, in the primary drying step, the drying temperature was raised to 85° C., the drying time was reduced to 1.5 hours and the average rate of drying was increased to 50 parts per hour.

Example 34

Dried pellets with a water content of 0.3 part (relative to 100 parts of EVOH) were obtained in the same manner as in Example 32 except that, in the secondary drying step, the drying temperature was lowered to 115° C., the drying time was prolonged to 28 hours and the average rate of drying was reduced to 0.9 part per hour.

Example 35

EVOH pellets were prepared and treated in the same manner as in Example 32 except that a 0.03% aqueous calcium acetate solution was used in lieu of the 0.2% aqueous boric acid solution. The calcium acetate content in the pellets before drying was 0.0075 part (calculated as calcium) per 100 parts of EVOH. Primary drying and secondary drying were carried out in the same manner as in Example 32 to give dried pellets.

Example 36

EVOH pellets were prepared and treated in the same manner as in Example 32 except that a 0.02% aqueous magnesium dihydrogen phosphate solution was used in lieu of the 0.2% aqueous boric acid solution. The magnesium dihydrogen phosphate content in the pellets before drying was 0.018 part (calculated as phosphate radical) per 100 parts of EVOH. Primary drying and secondary drying were carried out in the same manner as in Example 32 to give dried pellets.

Example 37

Pellets (2) were obtained in the same manner as in Example 32. Without carrying out boric acid treatment, they were subjected to primary drying and secondary drying in the same manner as in Example 1 to give dried pellets.

Comparative Example 21

Pellets (4) with a water content of 40% were obtained in the same manner as in the primary drying step in Example 26 except that nitrogen gas was passed over the surface of the pellets (3) at a rate of 0.3 m/sec. The difference in water content as compared with that before primary drying was 10%. The secondary drying step was carried out in the same manner as in Example 26 to give dried pellets with a water content of 0.6%.

Comparative Example 22

Pellets (4) with a water content of 3.0% were obtained in the same manner as in the primary drying step in Example 26 except that nitrogen gas was passed over the surface of the pellets (3) at a rate of 15 m/sec. The difference in water content as compared with that before primary drying was 47%. The secondary drying step was carried out in the same manner as in Example 26 to give dried pellets with a water content of 0.1%.

Comparative Example 23

Dried pellets with a water content of 0.1% were obtained in the same manner as in Example 26 except that, in the secondary drying step, the rate of passage was raised to 2.0 m/sec.

Comparative Example 24

Dried pellets with a water content of 0.3 part (relative to 100 parts of EVOH) were obtained in the same manner as in Example 32 except that, in the primary drying step, the drying temperature was lowered to 40° C., the drying time was prolonged to 25 hours and the average rate of drying was reduced to 3 parts per hour.

Comparative Example 25

Dried pellets with a water content of 0.1 part (relative to 100 parts of EVOH) were obtained in the same manner as in Example 32 except that, in the primary drying step, the drying temperature was raised to 125° C., the drying time was reduced to 0.14 hour and the average rate of drying was increased to 550 parts per hour.

Comparative Example 26

Dried pellets with a water content of 1 part (relative to 100 parts of EVOH) were obtained in the same manner as in Example 32 except that, in the secondary drying step, the drying temperature was lowered to 88° C., the drying time was prolonged to 480 hours and the average rate of drying was reduced to 0.05 part per hour.

Comparative Example 27

Dried pellets with a water content of 0.25 part (relative to 100 parts of EVOH) were obtained in the same manner as in Example 32 except that, in the secondary drying step, the drying temperature was raised to 155° C., the drying time was reduced to 4.5 hours and the average rate of drying was increased to 5.5 parts per hour.

The results of evaluation of the dried pellets obtained in Examples 26 to 37 and Comparative Examples 21 to 27 are shown in Table 4. In these Examples 26 to 37 and Comparative Examples 21 to 27, the coagulation liquid/strand weight ratio was always set at 800.

TABLE 4

| | Fish eyes | Torque fluctuation | Change in layer thickness |
| --- | --- | --- | --- |
| Example 26 | ◎ | ◯ | ◯ |
| Example 27 | ◯ | ◯ | ◯ |
| Example 28 | ◯ | ◯ | ◯ |
| Example 29 | ◎ | ◯ | ◯ |
| Example 30 | ◎ | ◯ | ◯ |
| Example 31 | ◎ | ◯ | ◯ |
| Example 32 | ◎ | ◯ | ◯ |
| Example 33 | ◯ | ◯ | ◯ |
| Example 34 | ◯ | ◯ | ◯ |
| Example 35 | ◎ | ◯ | ◯ |
| Example 36 | ◎ | ◯ | ◯ |
| Example 37 | ◎ | ◯ | ◯ |
| Comparative Example 21 | X | Δ | Δ |
| Comparative Example 22 | Δ | X | X |
| Comparative Example 23 | ◯ | X | X |
| Comparative Example 24 | X | Δ | Δ |
| Comparative Example 25 | ◯ | X | X |
| Comparative Example 26 | ◯ | X | X |
| Comparative Example 27 | ◯ | X | X |

INDUSTRIAL APPLICABILITY

In the process for continuous production of pellets by continuously extruding an EVOH solution in a strand form into a coagulation liquid and then cutting the resulting strand, the weight ratio between the coagulation liquid and the EVOH strand (coagulation liquid/EVOH strand) is set at 50 to 10,000 in accordance with the present invention. As a result, it is possible to produce EVOH pellets continuously and with good size precision, and the EVOH pellets are excellent in melt moldability. In particular, these EVOH pellets show excellent melt moldability in the production of multilayer laminates and, therefore, when they are used in producing various laminates, minute fish eyes smaller in diameter than 0.1 mm will not be formed. They are thus very useful in the fields of films, sheets, tubes, bags, containers and the like for packaging foodstuffs, drugs, agrochemicals, industrial chemicals and so forth and can also suitably be used in the production of fabricated articles and so forth which involves drawing, in particular.

What is claimed is:

1. A method of continuously producing saponified ethylene-vinyl acetate copolymer pellets by continuously extruding a solution of a saponified ethylene-vinyl acetate copolymer in the form of a strand into a coagulation liquid and then cutting the resulting strand, characterized in that the ratio between the weight X of the coagulation liquid and the weight Y of the strand, prior to coagulation of the extruded solution, of the saponified ethylene-vinyl acetate copolymer, namely the ratio X/Y is set at 100 to 10,000.

2. A method of producing saponified ethylene-vinyl acetate copolymer pellets as claimed in claim 1, wherein the coagulation liquid contains 1 to 10,000 ppm of a carboxylic acid, 1 to 50,000 ppm of a carboxylic acid ester, or 1 to 15,000 ppm of a carboxylic acid salt.

3. A method of producing saponified ethylene-vinyl acetate copolymer pellets as claimed in claim 1, wherein the coagulation liquid is water or a water-methanol mixed solvent.

4. A method of producing saponified ethylene-vinyl acetate copolymer pellets as claimed in claim 3, wherein the water content of the saponified ethylene-vinyl acetate copolymer pellets continuously produced is adjusted to 20 to 80% by weight and then brought into contact with an aqueous solution of at least one compound selected from the group consisting of a boron compound (B), an acetic acid salt (C) and a phosphoric acid compound (D), and wherein, when said solution is an aqueous solution of a boron compound (B), the content of said boron compound (B) in the aqueous boron compound (B) solution is adjusted to 0.001 to 0.5 part by weight per 100 parts by weight of the total sum of the water contained in the saponified ethylene-vinyl acetate copolymer pellets and the water contained in the aqueous boron compound (B) solution, when said solution is an aqueous solution of an acetic acid salt (C), the content of said acetic acid salt (C) in the aqueous acetic acid salt (C) solution is adjusted to 0.001 to 0.5 part by weight per 100 parts by weight of the total sum of the water contained in the saponified ethylene-vinyl acetate copolymer pellets and the water contained in the aqueous acetic acid salt (C) solution, and/or when said solution is an aqueous solution of a phosphoric acid compound (D), the content of said phosphoric acid compound (D) in the aqueous phosphoric acid compound (D) solution is adjusted to 0.0001 to 0.5 part by weight per 100 parts by weight of the total sum of the water contained in the saponified ethylene-vinyl acetate copolymer pellets and the water contained in the aqueous phosphoric acid compound (D) solution.

5. A method of producing saponified ethylene-vinyl acetate copolymer pellets which comprises subjecting the saponified ethylene-vinyl acetate copolymer pellets obtained by a production method defined in claim 1 further to drying treatment by a combination of stationary drying and fluidized drying.

6. A method of producing saponified ethylene-vinyl acetate copolymer pellets as claimed in claim 5, wherein fluidized drying is followed by stationary drying, wherein the water content of the saponified ethylene-vinyl acetate copolymer pellets before fluidized drying is 20 to 80% by weight and that after fluidized drying is 5 to 60% by weight and wherein the difference between the water content of the saponified ethylene-vinyl acetate copolymer pellets before fluidized drying and that after fluidized drying is not less than 5% by weight.

* * * * *